United States Patent
Hsu

(10) Patent No.: US 8,508,377 B2
(45) Date of Patent: Aug. 13, 2013

(54) MONITORING CIRCUIT FOR VEHICULAR LAMP

(75) Inventor: Ming-Yuan Hsu, Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 426 days.

(21) Appl. No.: 12/884,207

(22) Filed: Sep. 17, 2010

(65) Prior Publication Data

US 2011/0316708 A1    Dec. 29, 2011

(30) Foreign Application Priority Data

Jun. 29, 2010 (TW) ............................... 99121177 A

(51) Int. Cl.
*G08B 21/00* (2006.01)

(52) U.S. Cl.
USPC ...................... 340/635; 340/636.1; 340/686.5

(58) Field of Classification Search
USPC ................... 340/635, 636.1, 636.15, 636.18, 340/636.19, 641, 649, 653, 656, 686.5
See application file for complete search history.

(56) References Cited

U.S. PATENT DOCUMENTS

| | | | | |
|---|---|---|---|---|
| 4,247,813 | A * | 1/1981 | Gansert et al. | 322/99 |
| 5,422,548 | A * | 6/1995 | Yamashita et al. | 315/308 |
| 5,548,188 | A * | 8/1996 | Lee | 315/156 |
| 6,161,065 | A * | 12/2000 | Kamishima et al. | 701/36 |
| 7,173,375 | B2 * | 2/2007 | Takeda et al. | 315/77 |
| 7,675,244 | B2 * | 3/2010 | Blondia | 315/291 |
| 7,712,934 | B2 * | 5/2010 | Kovach | 362/512 |
| 7,782,592 | B2 * | 8/2010 | Nerheim | 361/232 |

* cited by examiner

*Primary Examiner* — Daniel Previl
(74) *Attorney, Agent, or Firm* — Altis Law Group, Inc.

(57) ABSTRACT

A monitoring circuit includes a first detecting unit, a second detecting unit, a comparing unit and an indicating unit. The first detecting unit is configured for detecting a temperature of a vehicular lamp and sending out a first signal. The second detecting unit is configured for detecting the surrounding temperature and sending out a second signal. The comparing unit is configured for comparing the first signal with the second signal, and controls the indicating unit to show the state of the vehicular lamp according to the compared result. When the first signal is higher than the second signal, the comparing unit controls the indicating unit to show that the vehicular lamp is unlit. When the first signal is equal to or lower than the second signal, the comparing unit controls the indicating unit to show that the vehicular lamp is lit.

8 Claims, 1 Drawing Sheet

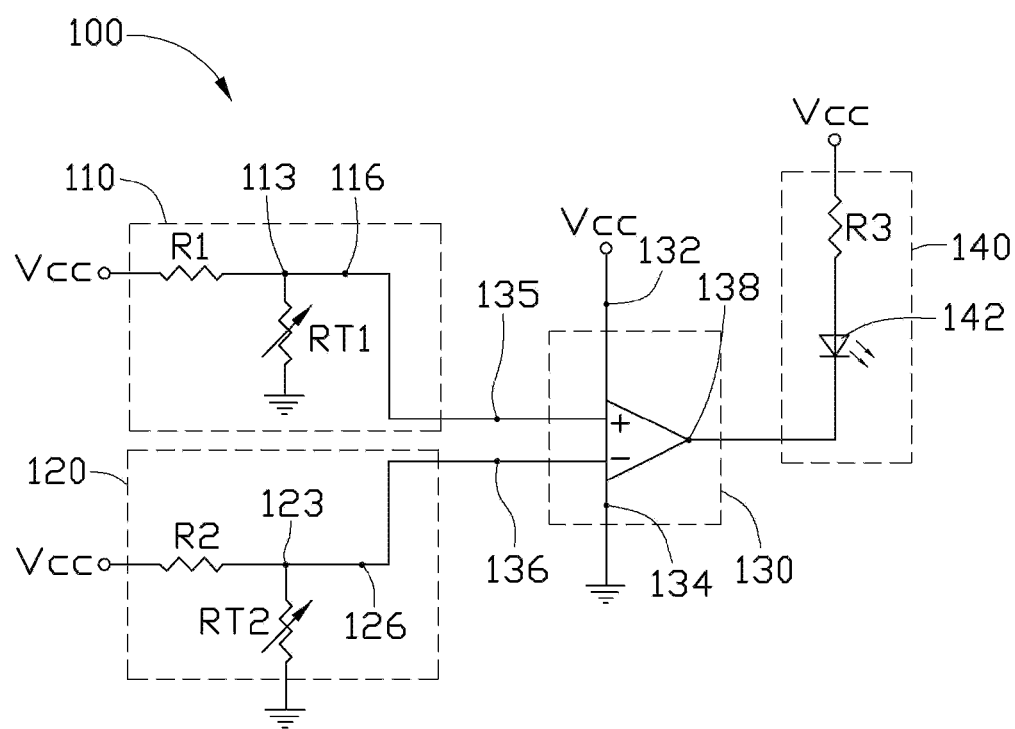

MONITORING CIRCUIT FOR VEHICULAR LAMP

BACKGROUND

1. Technical Field

The present disclosure relates to monitoring circuits and, particularly, to a monitoring circuit for a vehicular lamp.

2. Description of Related Art

Vehicular lamps are essential for vehicles. A vehicle usually has a number of lamps such as head lamps, fog lamps, turn lamps, brake lamps, and back-up lamps. Yet, these vehicular lamps are usually mounted on the vehicle outside of a cab and a driver cannot see the lamps directly. Thus, an indicator is set on the dashboard of the cab for showing if the vehicular lamps are turned on or off. Yet, the indicator cannot indicate if the vehicular lamps are turned on but are unlit because of circuit or lamp fault. In this case the driver will get the wrong information about the vehicular lamps and it may lead to traffic accidents. Thus, what is needed is a monitoring circuit for a vehicular lamp which overcomes the above shortcoming.

BRIEF DESCRIPTION OF THE DRAWINGS

Many aspects of the embodiments can be better understood with reference to the following drawing. The components in the drawing are not necessarily drawn to scale, the emphasis instead being placed upon clearly illustrating the principles of the present disclosure.

The drawing is a circuit diagram of a monitoring circuit for a vehicular lamp according to an exemplary embodiment.

DETAILED DESCRIPTION

Referring to the drawing, a monitoring circuit 100 includes a first detecting unit 110, a second detecting unit 120, a comparing unit 130 and an indicating unit 140. The first detecting unit 110 is used for detecting the temperature of a vehicular lamp (not shown) and sending out a corresponding first signal to the comparing unit 130. The second detecting unit 120 is used for detecting the surrounding temperature and sending out a corresponding second signal to the comparing unit 130. The comparing unit 130 compares the first signal with the second signal and controls the indicating unit 140 to show the state of the vehicular lamp according to the compared result. In detail, when the lamp temperature represented by the first signal is higher than the surrounding temperature represented by the second signal, the comparing unit 130 controls the indicating unit 140 to show the vehicular lamp is working normally. When the lamp temperature represented by the first signal is lower than or equal to the surrounding temperature represented by the second signal, the comparing unit 130 controls the indicating unit 140 to show the vehicular lamp is abnormal.

The first detecting unit 110 includes a first resistor R1, a first thermo sensitive resistor RT1 and a first output terminal 116. One end of the first resistor R1 is connected to a power supply Vcc, the other end is connected to one end of the first thermo sensitive resistor RT1. In this embodiment, the power supply Vcc is a 5 volt stable power supply. The first thermo sensitive resistor RT1 is set in the vehicular lamp, for example, adhered to the inner surface of the reflector of the vehicular lamp, or adhered in the lamp holder. The other end of the thermo sensitive resistor RT1 is grounded. The first output terminal 116 connects a first node 113 between the first resistor R1 and the first thermo sensitive resistor RT1 to the comparing unit 130. The first signal output by the first detecting unit 110 is a voltage signal which is calculated as Vcc*(RT1/(RT1+R1)).

The second detecting unit 120 includes a second resistor R2, a second thermo sensitive resistor RT2 and a second output terminal 126. One end of the second resistor R2 is connected to the power supply Vcc, the other end thereof is connected to one end of the second thermo sensitive resistor RT2. The another end of the second thermo sensitive resistor RT2 is grounded. The second thermo sensitive resistor RT2 is away from the vehicular lamp and other thermal sources of the vehicle, for example, the second thermo sensitive resistor RT2 is adhered to the chassis of the vehicle. The second output terminal 126 connects a second node 123 between the second resistor R2 and the second thermo sensitive resistor RT2 to the comparing unit 130. The second signal output by the second detecting unit 120 is a voltage signal which is calculated as Vcc*(RT2/(RT2+R2)).

The resistance value of the first resistor R1 is smaller than that of the second resistor R2. In this embodiment, the resistance value of the first resistor R1 is 9 k ohm, and the resistance value of the second resistor R2 is 10 k ohm. The resistance value of the first thermo sensitive resistor RT1 is same as that of the second thermo sensitive resistor RT2 when they have the same temperature. The resistance value of the first thermo sensitive resistor RT1 and the second thermo sensitive resistor RT2 decrease when the temperature increases.

The comparing unit 130 is an operational amplifier, and includes a power terminal 132, a grounding terminal 134, a positive input terminal 135, a negative input terminal 136 and an output terminal 138. The power terminal 132 is connected to the power supply Vcc. The grounding terminal 134 is grounded. The positive input terminal 135 is connected to the first output terminal 116 of the first detecting unit 110. The negative input terminal 136 is connected to the second output terminal 126 of the second detecting unit 120. The comparing unit 130 compares the first signal input from the positive input terminal 135 and the second signal input from the negative input terminal 136. When the first signal is larger than the second signal, the output terminal 138 of the comparing unit 130 outputs a high level control signal, otherwise outputs a low level control signal.

The indicating unit 140 includes a light-emitting diode (LED) 142 and a third resistor R3. The anode of the LED 142 is connected to the power supply Vcc through the third resistor R3. The cathode of the LED 142 is connected to the output terminal 138 of the comparing unit 130.

When the vehicular lamp is unlit, both the first thermo sensitive resistor RT1 and the second thermo sensitive resistor RT2 have the same surrounding temperature, the resistance values of the first thermo sensitive resistor RT1 is equal to that of the second thermo sensitive resistor RT2. When the resistance value of the first resistor R1 is smaller than that of the second resistor R2, the first signal will be larger than the second signal, the comparing unit 130 will output a high level control signal, for example, a 5 volt signal. In this case, the voltages of the anode and the cathode of the LED 142 are equal to each other, thus, the LED 142 is cut off and unlit, the user can know the vehicular lamp is unlit when he/she sees the LED 142 is unlit. When the vehicular lamp is lit, the temperature of the vehicular lamp will increase, the resistance value of the first thermo sensitive resistor RT1 will decrease. As a result, the first signal will decrease correspondingly. Yet, the resistance value of the second thermo sensitive resistor RT2 keeps stable because of the surrounding temperature is stable in this case. As a result, the second signal keeps stable while the first signal decreases. When the first signal becomes smaller than or equal to the second signal, the comparing unit 130 will output a low level control signal, for example, a 0 volt signal. In this case, the voltage of the anode is higher than that of the cathode, thus the LED 142 is turned on and lit, the user can know the vehicular lamp is lit when he/she sees the LED 142 is lit.

Moreover, it is to be understood that the disclosure may be embodied in other forms without departing from the spirit thereof. Thus, the present examples and embodiments are to be considered in all respects as illustrative and not restrictive, and the disclosure is not to be limited to the details given herein.

What is claimed is:

1. A monitoring circuit for a vehicular lamp, comprising:
   a first detecting unit configured for detecting a temperature of the vehicular lamp and sending out a first signal representing the temperature of the vehicular lamp;
   a second detecting unit configured for detecting an environmental temperature and sending out a second signal representing the environmental temperature;
   a comparing unit configured for receiving the first and second signals, comparing the first signal with the second signal, and sending out a control signal according to the compared result; and
   an indicating unit configured for showing the state of the vehicular lamp according to the control signal; wherein
   when the first signal is higher than the second signal, the comparing unit controls the indicating unit to show that the vehicular lamp is unlit; and
   when the first signal is equal to or lower than the second signal, the comparing unit controls the indicating unit to show that the vehicular lamp is lit.

2. The monitoring circuit of claim 1, wherein the first detecting unit comprises a first resistor, a first thermo sensitive resistor and a first output terminal, one end of the first resistor is configured for being connected to a power supply, the other end of the first resistor is connected to one end of the first thermo sensitive resistor, the other end of the first thermo sensitive resistor is grounded, the first thermo sensitive resistor is configured for being set in the vehicular lamp, the first output terminal connects a first node between the first resistor and the first thermo sensitive resistor to the comparing unit.

3. The monitoring circuit of claim 2, wherein the second detecting unit comprises a second resistor, a second thermo sensitive resistor and a second output terminal, one end of the second resistor is configured for being connected to the power supply, the other end of the second resistor is connected to one end of the second thermo sensitive resistor, the other end of the second thermo sensitive resistor is grounded, the second thermo sensitive resistor is configured for being set away from the vehicular lamp, the second output terminal connects a second node between the second resistor and the second thermo sensitive resistor to the comparing unit.

4. The monitoring circuit of claim 3, wherein the resistance value of the second resistor is larger than the resistance value of the first resistor.

5. The monitoring circuit of claim 3, wherein the resistance value of the first thermo sensitive resistor is the same as the resistance value of the second thermo sensitive resistor when the first thermo sensitive resistor and the second thermo sensitive resistor suffer the same temperature.

6. The monitoring circuit of claim 3, wherein the resistance values of the first thermo sensitive resistor and the second thermo sensitive resistor decrease when temperature increases.

7. The monitoring circuit of claim 6, wherein the comparing unit is an operational amplifier, and comprises a power terminal, a grounding terminal, a positive input terminal, a negative input terminal and an output terminal, the power terminal is configured for being connected to the power supply, the grounding terminal is grounded, the positive input terminal is connected to the first output terminal, the negative input terminal is connected to the second output terminal, the comparing unit compares the first signal inputted from the positive input terminal and the second signal inputted from the negative input terminal, when the first signal is larger than the second signal, the output terminal outputs a high level signal, and when the first signal is lower than or equal to the second signal, the output terminal outputs a low level signal.

8. The monitoring circuit of claim 7, wherein the indicating unit comprises a light-emitting diode and an third resistor, the anode of the light-emitting diode is configured for being connected to the power supply through the third resistor, and the cathode of the light-emitting diode is connected to the output terminal of the comparing unit.

\* \* \* \* \*